Inventor.
Otto Hörner.
By. [signature] Atty.

United States Patent Office 2,871,291

Patented Jan. 27, 1959

2,871,291

CONFERENCE CIRCUIT IN TWO-WAY COMMUNICATION SYSTEM WITH FOUR-WIRE OPERATION

Otto Hörner, Munich, Germany, assignor to Siemens & Halske Aktiengesellschaft, Berlin and Munich, a corporation of Germany Application June 29, 1956, Serial No. 594,923

Claims priority, application Germany July 16, 1955

7 Claims. (Cl. 179—1)

This invention is concerned with conference circuits in two-way communication systems with four-wire operation, that is, providing two channels each having two wires.

In conference systems with four-wire operation, all parties participating in a conference call should be given the possibility to listen to the conversation carried on between the principal party who called the conference and another participating party and should also be able to enter the conversation. Mutual interference between the two transmission channels must thereby be avoided. In order to prevent electric coupling, it is necessary to make the lamping between the two transmission channels as high as possible.

It is known to effect the operative coupling of the listen-in conference parties to the two transmission channels over a circuit having forked branches. The damping between the channels incident to transmitting and receiving, respectively, and the common listen-in conference channel should thereby be zero, if possible. In dimensioning the line image in two-wire operation, there appears another difficulty caused by alterations in the damping according to the number of interconnected parties, requiring adjustability of the line image so as to provide the image value that may be required in any given case. Lines of different length cause similar difficulties.

It is also known to couple the two speech channels with the listen-in conference channel over resistors. The disadvantage of such an arrangement resides in considerable increase of the damping factor between the transmitting-receiving channels and the listen-in conference channel, respectively.

The object of the invention is to provide an arrangement which permits the listen-in conference participants to hear two-way conversation carried on over two transmission channels, without bringing about an auxiliary detrimental coupling between the transmission channels that may cause whistling.

This object is realized by selectively providing mutual transmission between two parties. During this transmission, the remaining parties are switched to "listening," that is only the loudspeakers of the listening-in stations are operatively connected to a common busbar or listen-in channel and the corresponding microphones are disconnected. In order to avoid auxiliary coupling of the two transmission channels, resulting in a greater whistle point spacing, the two transmission channels are connected to the common listen-in channel over two galvanically interconnected four-terminal coupling links or amplifiers each adapted to pass speech currents in one direction only (quadripoles), each comprising either two simple tubes or a double tube (a tube having two amplifier tube systems) or transistors. As a result, the above-mentioned auxiliary coupling between the two transmission channels cannot occur, while a tight coupling thereto, of the listening-in devices of the passive conference participants, is however secured. The loudspeakers of the listening-in parties may be connected by way of a busbar or common listen-in channel, to the outputs of the two quadripoles either directly or by way of an amplifier.

The foregoing and other objects and features will appear from the description which will be rendered below with reference to the accompanying drawing. In the drawing.

Figure 1:
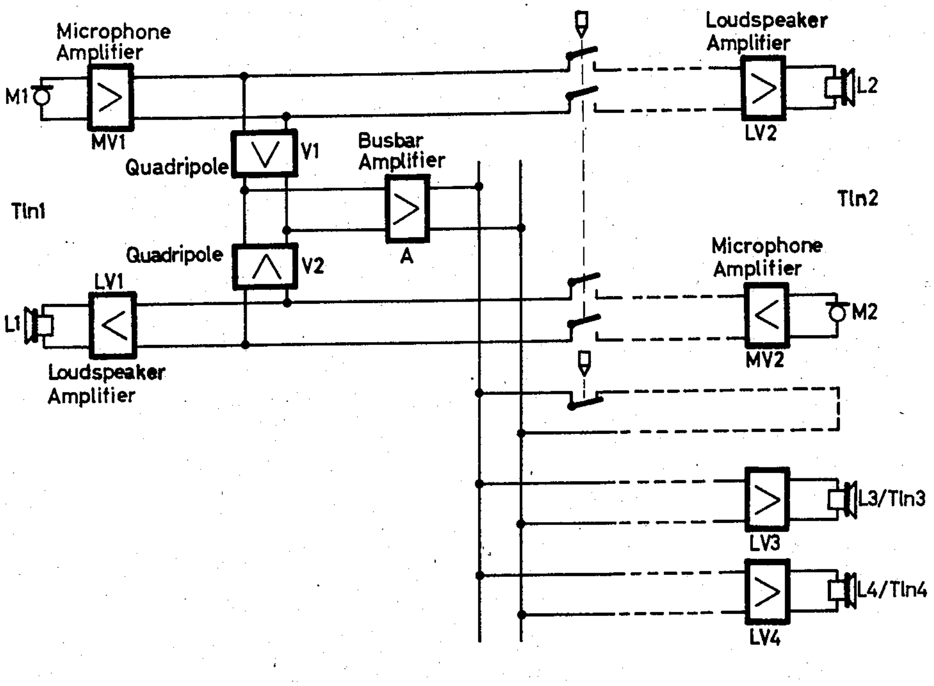
Fig. 1 shows an embodiment of the invention in its principal features.

Details not required for an understanding of the invention have been omitted from the drawing and will also be omitted from the following description of the operation.

Referring to Fig. 1, it shall be assumed that the subscriber at station T*ln*1 desires to carry on conversation with the subscriber at T*ln*2 and that such conversation shall be heard by the remaining conference participants T*ln*3 and T*ln*4. The subscribers T*ln*1 and T*ln*2 are for this purpose in usual known manner interconnected over a four-wire circuit forming two principal channels, for example, by means of switches, keys or well known plug-controlled circuits, as shown in schematic manner by simple contact means. The required microphone amplifiers MV1 and MV2 and the loudspeaker amplifiers LV1 and LV2 are included in the two principal transmission channels. Conversation between the two interconnected parties can be carried on because the microphone of each is connected with the loudspeaker of the other; microphone M1 being connected with loudspeaker L2 and microphone M2 being connected with loudspeaker L1.

While conversation is carried on between the principal parties T*ln*1 and T*ln*2, the remaining passive conference parties T*ln*3 and T*ln*4 will be able to listen-in, because their loudspeakers L3 and L4 have been connected to the two principal transmission channels by way of the listen-in or busbar amplifier A while their microphones have been disconnected to avoid acoustic feedback coupling thereof. The corresponding switching operations are effected at the time of interconnecting the parties T*ln*1 and T*ln*2 and the resulting circuit conditions remain for the duration of the conference called by the party T*ln*1. Directional or polarized quadripoles V1 and V2, that is, four-terminal coupling links or amplifiers adapted to pass speech currents only in one predetermined direction, are connected in opposition across the two principal transmission channels and mutually galvanically interconnected, as shown, to secure transmission of speech from each principal channel by way of the busbar amplifier A to the common busbar (listen-in channel) and thence amplifiers LV3 and LV4 to the loudspeakers L3 and L4 while positively preventing mutual interference between the two principal transmission channels.

Figure 2:
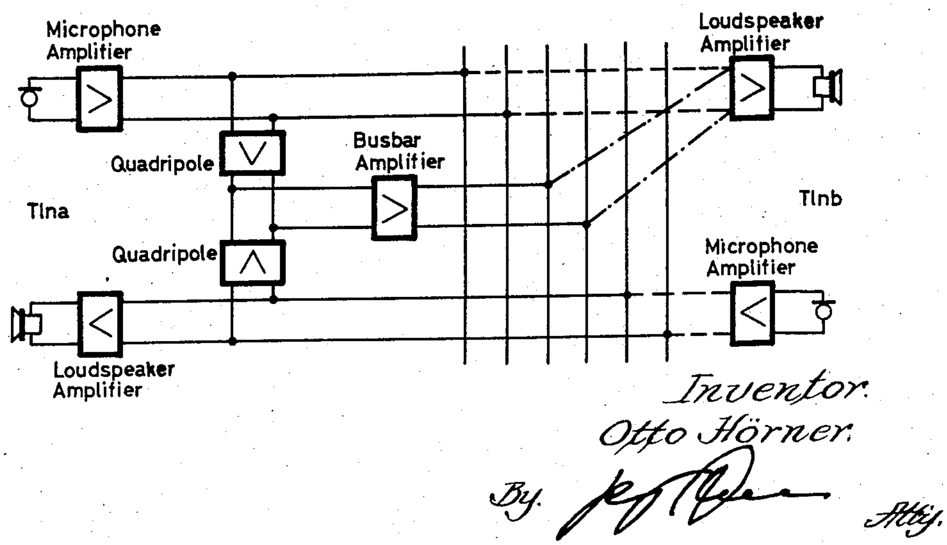
Fig. 2 illustrates the switching principle with respect to one party to a conference call.

Fig. 2 illustrates the switching principle applied in certain cases. If it is assumed that the subscriber T*lna* wishes to talk with subscriber T*lnb* while a third party shall be able to listen-in, the busbars will be connected by plugs or switching means as indicated in dash lines. The principal parties are accordingly connected together as in Fig. 1. However, if the subscriber T*lnb* shall only listen-in on a conversation between T*lna* and another party (not shown), the connection indicated by dot-dash line will be established. The other (not illustrated) principal conference party will be connected like T*lnb* in the previously explained example.

The use of the invention is not limited to the examples shown. All conference parties may be initially connected so as to allow each to converse with each other and each such conversation between any two of the parties may be listened to by the remaining parties.

Changes may be made within the scope and spirit of the appended claims.

I claim:

1. In a communication system, a four-wire conference circuit forming two two-wire principal channels for interconnecting two subscribers for two-way conversation, a four-terminal amplifier coupling link for each of said principal channels and having its input terminals connected to the wires of the corresponding channel, means for galvanically interconnecting corresponding output terminals of said coupling links to form a common two-wire output therefor, each of said coupling links being adapted to pass speech currents only from its corresponding principal channel to said common output, a two-conductor busbar, circuit means for connecting said common output of said coupling links to said busbar to pass said speech currents thereto, and circuit means for connecting to the conductors of said busbar the line wires of at least one further subscriber for transmitting to such subscriber the speech currents from said principal channel by way of the respective coupling links and said busbar.

2. A conference circuit according to claim 1, comprising amplifier means disposed between said common output of said coupling links and said busbar.

3. A conference circuit according to claim 1, comprising amplifier means disposed in the circuit means extending from said busbar to said further subscriber.

4. A conference circuit according to claim 1, comprising amplifier means disposed between said common output of said coupling links and said busbar, and amplifier means disposed in the circuit means extending from said busbar for connecting said amplifier means to said further subscriber.

5. A conference circuit according to claim 1, comprising coupling links each containing two simple tubes.

6. A conference circuit according to claim 1, comprising coupling links each having one tube containing two amplifier systems.

7. A conference circuit according to claim 1, comprising coupling links each containing transistors.

References Cited in the file of this patent

UNITED STATES PATENTS

| | | |
|---|---|---|
| 1,734,104 | Wright | Nov. 5, 1929 |
| 1,782,847 | Grandin | Nov. 25, 1930 |